US008483209B2

(12) United States Patent
Haartsen

(10) Patent No.: US 8,483,209 B2
(45) Date of Patent: Jul. 9, 2013

(54) COMMUNICATION APPARATUS AND SERVER, AND METHODS AND COMPUTER PROGRAMS THEREFORE

(75) Inventor: Jacobus Cornelis Haartsen, BG Hardenberg (NL)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1227 days.

(21) Appl. No.: 12/260,362

(22) Filed: Oct. 29, 2008

(65) Prior Publication Data
US 2010/0103926 A1    Apr. 29, 2010

(51) Int. Cl.
*H04L 12/66*    (2006.01)

(52) U.S. Cl.
USPC .......................................................... 370/352

(58) Field of Classification Search
None
See application file for complete search history.

(56) References Cited

U.S. PATENT DOCUMENTS

| | | | |
|---|---|---|---|
| 6,603,849 B2* | 8/2003 | Lin et al. ................... | 379/221.01 |
| 7,395,085 B1* | 7/2008 | Mauer et al. ................ | 455/552.1 |
| 7,961,714 B1* | 6/2011 | Watson et al. ................ | 370/352 |
| 2002/0090975 A1* | 7/2002 | Laiho et al. .................... | 455/552 |
| 2004/0248574 A1* | 12/2004 | Watanabe et al. ........... | 455/435.1 |
| 2007/0049281 A1* | 3/2007 | Chen et al. ..................... | 455/445 |
| 2007/0082683 A1* | 4/2007 | Na et al. ....................... | 455/456.1 |
| 2008/0115125 A1* | 5/2008 | Stafford et al. .................... | 718/1 |
| 2008/0227445 A1* | 9/2008 | Tang et al. .................. | 455/426.1 |

FOREIGN PATENT DOCUMENTS

| | | |
|---|---|---|
| JP | 2004140786 | 5/2004 |
| JP | 200674620 | 3/2008 |
| WO | 2004091246 A1 | 10/2004 |
| WO | 2008110664 A1 | 9/2008 |

OTHER PUBLICATIONS

International Search Report, corresponding to PCT/EP2009/055212, mailed on Apr. 1, 2010.
Written Opinion of the International Searching Authority, corresponding to PCT/EP2009/055212, mailed on Apr. 1, 2010.

* cited by examiner

*Primary Examiner* — Minh-Trang Nguyen
(74) *Attorney, Agent, or Firm* — Renner, Otto, Boisselle & Sklar, LLP

(57) ABSTRACT

A communication apparatus enabled to communicate over at least one communication bearer is disclosed. The communication apparatus comprises a receiver arranged to receive an page message from a public land mobile network node, the page message being present when another party requests communication with the communication apparatus; and a connection controller arranged to establish a connection to the Internet over at least one of the communication bearers for providing an IP connection to the another party, and to send a notification over the established connection to the Internet to a page server managing the paging by the public land mobile network for enabling closing of the paging. Further, a page server connected to the Internet is disclosed. The page server comprises a connection request receiver arranged to receive a request from a first party requesting communication with a second party; an interface for communicating with a public land mobile network, wherein the interface is arranged to provide a page request to the public land mobile network, upon the received request from the first party, on provision of an page message; and a notification receiver arranged to receive a notification, over an established connection between the second party and the Internet, that the page message is received, wherein the interface is further arranged to provide a page release request, upon the reception of the notification, to the public land mobile network for closing of the paging. Methods and computer programs are also disclosed.

32 Claims, 5 Drawing Sheets

COMMUNICATION APPARATUS AND SERVER, AND METHODS AND COMPUTER PROGRAMS THEREFORE

TECHNICAL FIELD

The present invention relates to a communication apparatus enabled to communicate over at least one communication bearer and a page server connected to the Internet. The invention further relates to methods and computer programs for the communication apparatus and the page server, respectively.

BACKGROUND

Communication over the Internet, i.e. communication using the Internet Protocol (IP) between entities having Internet Protocol addresses, is widespread, and is believed be even more common regardless of which communication bearer that is used. Examples on communication bearers are wired connections such as public switched telephone network, asymmetric digital subscriber line, Ethernet, local area network, etc. or wireless connections such as WiFi, cellular telecommunication network, WiMAX, short range radio connection, etc. An example of a service is Voice over IP. The multitude of connections, especially when considering the wireless connections, raises the problem of mobility. Further, often a terminal is able to communicate over more than one type of connection. This is sometimes called 'Always-Best-Connected' (ABC) concept. The aggregate problem of mobility and ABC concept is put to its edge when communication is a user-terminated transaction. Different bearers may correspond to different networks that are not always inter-connected. Capacity and complexity problems can arise if a request for communication should be initiated on a plurality of bearers in parallel. Further, if a terminal has to listen for a multitude of bearers to catch an incoming request for communication, consumption of hardware resources and power can become out of hand. Similar, if a request for communication has to be provided on a multitude of bearers and in a multitude of geographical places, complexity, interference and/or capacity problems may arise. It is therefore a desire to provide a less complex approach for ensuring mobility and connection.

SUMMARY

The present invention is based on the understanding that mobility is best provided by a public land mobile network (PLMN), for example the Global System for Mobile Commications (GSM). By letting the terminal listen to broadcasting from the PLMN, the request for communication is able to reach the terminal in a feasible way. The terminal can then use its ABC mechanism to get in communication with the party requesting communication. The broadcasting of the request is provided by the PLMN on request from a page server, and when the terminal has established communication, it can notify the page server, which then can instruct the PLMN to release paging.

According to a first aspect, there is provided a communication apparatus enabled to communicate over at least one communication bearer. The communication apparatus comprises a receiver arranged to receive an page message from a public land mobile network node, the page message being present when another party requests communication with the communication apparatus; and a connection controller arranged to establish a connection to the Internet over at least one of the communication bearers for providing an IP connection to the another party, and to send a notification over the established connection to the Internet to a page server managing the paging by the public land mobile network for enabling closing of the paging.

The public land mobile network can be a GSM network. The page message may be provided over a paging channel indicated in a broadcast control channel of the GSM network.

The notification to the page server may be a page acknowledgement.

The page message may comprise information associated with an IP address of the another party, and the provision of the IP connection to the another party may be performed by using the IP address of the another party.

The connection controller may be arranged to gain an IP address of the another party from the page server over the established connection to the Internet, and the provision of the IP connection to the another party may be performed by using the IP address of the another party. The receiver may further be arranged to periodically read a control channel, and the apparatus may further be arranged to, if location area information on the control channel is different from a previously read location area information stored in the communication apparatus, connect to the page server to update the location area information provided in the page server.

According to a second aspect, there is provided a method for establishing an IP connection with another party upon request from the another party. The method comprises receiving a page message from a public land mobile network node, the page message being present when the another party requests communication; determining a connection from at least one feasible connection option to connect to the Internet; establishing the connection to the Internet over at least one communication bearer for providing an IP connection to the another party; and sending a notification over the established connection to the Internet to a page server managing the paging by the public land mobile network for enabling closing of the paging.

The public land mobile network may be a GSM network, wherein the method further may comprise determining the paging channel from a broadcast control channel of the GSM network.

The determining of the connection may comprise a decision based on any of availability, power, cost, or performance needs, or any combination thereof.

The determining of the connection may comprise determining a plurality of connections to operate in parallel.

The page message may comprise information associated with the IP address of the another party, wherein the providing of the IP connection to the another party may be performed by using the IP address of the another party.

The method may further comprise gaining an IP address of the another party from the page server over the established connection to the Internet, wherein the providing of the IP connection to the another party may be performed by using the IP address of the another party.

The method may further comprise periodically reading a control channel; and if location area information on the control channel is different from a previously read location area information, connecting to the page server to update the location area information provided in the page server.

According to a third aspect, there is provided a computer readable medium comprising program code comprising instructions which when executed by a processor are arranged to cause the processor to perform receiving of a page message from a public land mobile network node, the page message being present when the another party requests communication; establishing of a connection to the Internet over at least one communication bearer for providing an IP connection to the another party; and sending of a notification over the established connection to the Internet to a page server managing the paging by the public land mobile network for enabling closing of the paging.

The page message may comprise information associated with the IP address of the another party, and the instructions may further be arranged to cause the processor to provide the IP connection to the another party by using the IP address of the another party.

The instructions may further be arranged to cause the processor to gain an IP address of the another party from the page server over the established connection to the Internet, and to provide the IP connection to the another party by using the IP address of the another party.

The instructions may further be arranged to cause the processor to enable periodical reading of a control channel; and if location area information on the control channel is different from a previously read location area information, provide a connection to the page server to update the location area information provided in the page server.

According to a fourth aspect, there is provided a page server connected to the Internet. The page server comprises a connection request receiver arranged to receive a request from a first party requesting communication with a second party; an interface for communicating with a public land mobile network, wherein the interface is arranged to provide a page request to the public land mobile network, upon the received request from the first party, on provision of an page message; and a notification receiver arranged to receive a notification, over an established connection between the second party and the Internet, that the page message is received, wherein the interface is further arranged to provide a page release request, upon the reception of the notification, to the public land mobile network for closing of the paging.

The page message may comprise information associated with the IP address of the first party. The page server may further comprise a table comprising a set of IP addresses and their associated Local Area Codes, such that the page request further comprises the Local Area Code associated with its IP address.

The page server may further be arranged to provide information associated with the IP address of the first party to the second party over its connection to the Internet. The page server may further comprise a table comprising a set of IP addresses and their associated Local Area Codes, such that the provided information to the second party further comprises the Local Area Code associated with its IP address. The page server may further be arranged to be accessed by a party for updating of location area information of the party.

According to a fifth aspect, there is provided a method for providing connection between a first party and a second party. The method comprises receiving a request over the Internet from a first party requesting communication with a second party; providing a page request to a public land mobile network, upon the receiving of the request from the first party, on provision of a page message such that the page message is transmitted on a paging channel such that the second party can establish a connection to the Internet over at least one communication bearer for providing an IP connection to the first party; receiving a notification, over an established connection between the second party and the Internet, that the page message is received; and providing a page release request, upon the reception of the notification, to the public land mobile network for closing of the paging.

The page message may comprise information associated with the IP address of the first party such that the providing of the IP connection to the another party is performed by using the IP address of the another party. The method may further comprise determining a Local Area Code associated with the IP address of the second party; and including the Local Area Code in the page request. The method may further comprise enabling access by a party for receiving update information about location area information of the party.

The method may further comprise providing information associated with an IP address of the another party from the page server over the established connection to the Internet such that the providing of the IP connection to the another party is performed by using the IP address of the another party. The method may further comprise determining a Local Area Code associated with the IP address of the second party; and including the Local Area Code in the providing of information.

According to a sixth aspect, there is provided a computer readable medium comprising program code comprising instructions which when executed by a processor is arranged to cause the processor to perform receiving of a request over the Internet from a first party requesting communication with a second party; providing of a page request to a public land mobile network, upon the receiving of the request from the first party, on provision of a page message such that the page message is transmitted on a paging channel such that the second party can establish a connection to the Internet over at least one communication bearer for providing an IP connection to the first party; receiving of a notification, over an established connection between the second party and the Internet, that the page message is received; and providing of a page release request, upon the reception of the notification, to the public land mobile network for closing of the paging.

The instructions may further be arranged to cause the processor to, in the page request, enable the page message to comprise information associated with the IP address of the first party such that the providing of the IP connection to the another party is performed by using the IP address of the another party. The program code may further comprise instructions which when executed by a processor is arranged to cause the processor to perform determining a Local Area Code associated with the IP address of the second party; and including the Local Area Code in the page request. The program code may further comprise instructions which when executed by a processor are arranged to cause the processor to enable access by a party for receiving update information about location area information of the party.

The instructions may further be arranged to cause the processor to provide information associated with an IP address of the another party from the page server over the established connection to the Internet such that the providing of the IP connection to the another party is performed by using the IP address of the another party. The program code may further comprise instructions which when executed by a processor is arranged to cause the processor to perform determining a Local Area Code associated with the IP address of the second party; and including the Local Area Code in the provided information.

DETAILED DESCRIPTION

Figure 1:
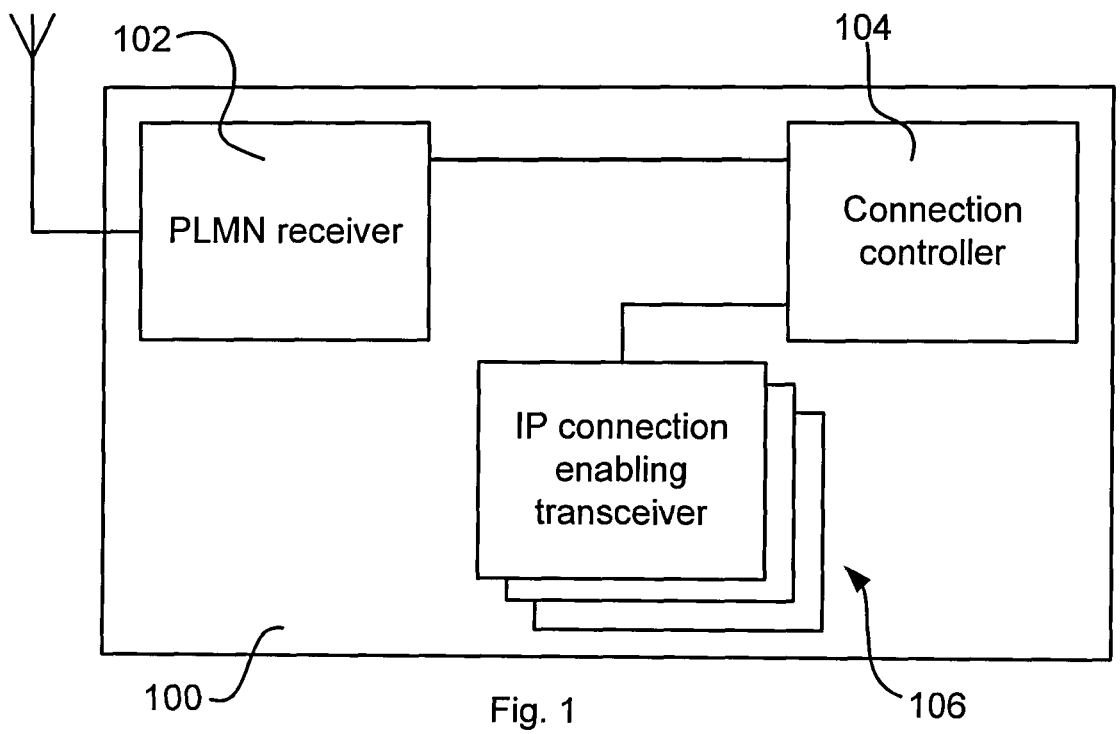
FIG. 1 is a block diagram schematically illustrating a communication apparatus according to an embodiment.

FIG. 1 is a block diagram schematically illustrating a communication apparatus 100 according to an embodiment. The communication apparatus may comprise a plurality of elements normally provided, such as signal processing means, central processing unit, memory, user interface, etc. This is not illustrated in FIG. 1 not to obscure features of the invention, and will not be elucidated here. The communication apparatus 100 comprises a PLMN receiver 102 arranged to receive a page message from a PLMN, e.g. over a paging channel in a broadcast control channel e.g. of a GSM network. The PLMN receiver 102 should preferably also be able to receive control information from the PLMN, e.g. on a frequency correction channel and a synchronization channel to be able to apply proper frequency and timing for receiving the page message. Further, it is preferable that the PLMN receiver 102 is able to receive a broadcasting control channel and a common control channel to be able to find location area identity and a paging channel, respectively. Similar channels and information gaining adapted to the actual PLMN are equally feasible. This provides for mobility, as will be further demonstrated below. The page message indicates that another party is requesting connection with the communication apparatus. The page message can comprise an IP address of the another party. The message can also comprise information associated to the IP address of the another party, e.g. a name or a telephone number. Alternatively, the page message does not provide information about the first party. In that case, the second party cannot directly make a connection to the first party. Instead, the information about the first party resides in e.g. a page server providing the page request to the PLMN to send the page message. On a connection request, the second party first connects with the page server. The second party thereby acknowledges the page receipt, but also obtains information about the first party, e.g. a name, telephone number, or IP address. Thereafter, the second party connects to the first party. This alternative approach obviates the need for additional information in the paging message on the PLMN air interface.

The communication apparatus 100 also comprises a connection controller 104, which is arranged to determine a suitable connection to the Internet among one or more available IP connections provided by one or more IP connection enabling receivers 106. The suitable connection can be one connection or a plurality of those available connections working in parallel. The determination can be based on any of availability, power, cost, or performance needs, or any combination thereof. The connection is established accordingly and the connection controller 104 sends a notification, preferably over the established connection, to a page server managing the paging such that paging can be stopped. The notification is preferably a page acknowledgement. Communication between the parties is thus enabled. This approach provides for mobility and power saving.

Figure 2:
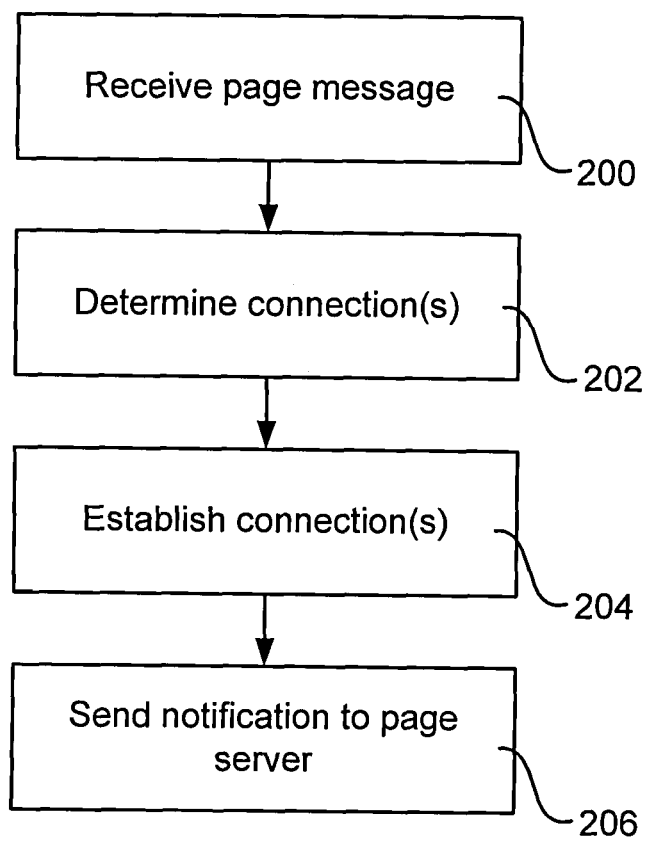
FIG. 2 is a flow chart illustrating a method for a communication apparatus according to an embodiment.

FIG. 2 is a flow chart illustrating a method for a communication apparatus according to an embodiment. In a page message reception step 200, a page message is received from a PLMN, as elucidated above. A suitable connection is determined in a connection determination step 202. The determination can, as demonstrated above, be based on different criteria, and the connection can be one or more connections. The determined connection is established in a connection establishment step 204, and a notification is sent to a page server in a notification sending step 206. Alternative embodiments are illustrated in FIGS. 8 and 9.

Figure 8:
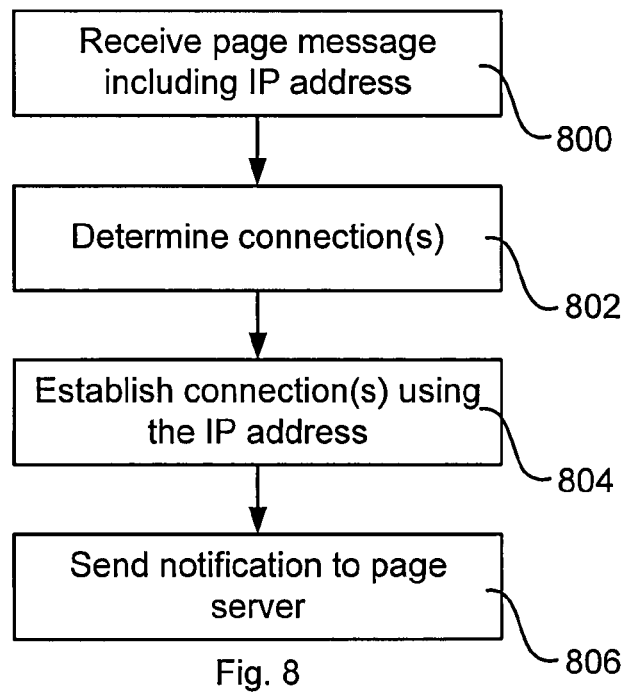
FIG. 8 is a flow chart illustrating a method for a communication apparatus according to an embodiment.

FIG. 8 is a flow chart illustrating a method for a communication apparatus according to an embodiment. In a page message reception step 800, a page message is received from a PLMN, including information associated with the communication requesting party, such as IP address, name or telephone number. A suitable connection is determined in a connection determination step 802. The determination can, as demonstrated above, be based on different criteria, and the connection can be one or more connections. The determined connection is established in a connection establishment step 804, using the IP address of the communication requesting party, and a notification is sent to a page server in a notification sending step 806 such that paging can be closed.

Figure 9:
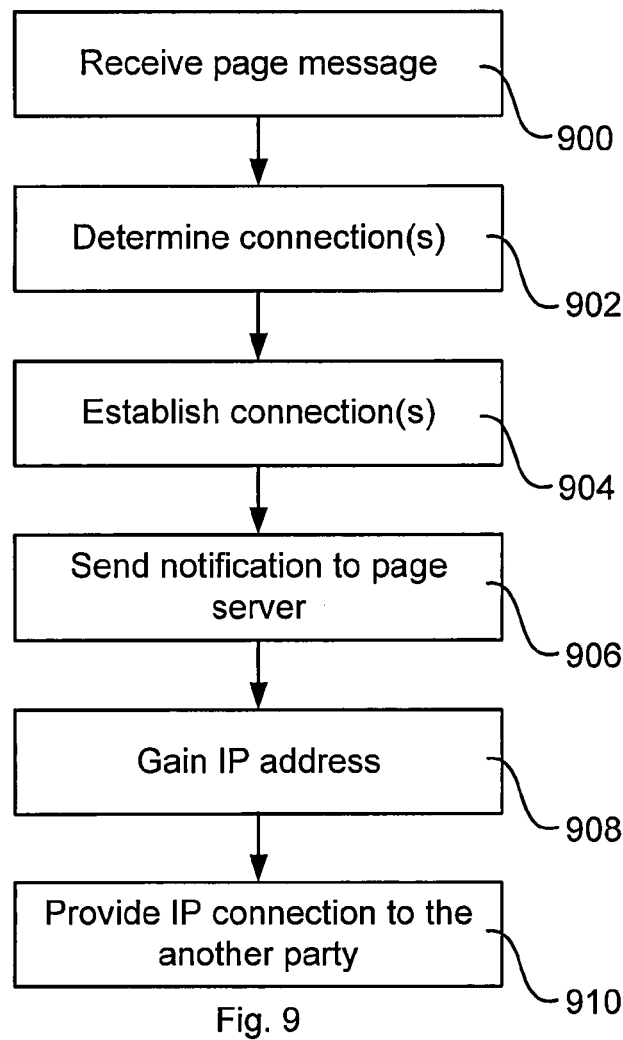
FIG. 9 is a flow chart illustrating a method for a communication apparatus according to an embodiment.

FIG. 9 is a flow chart illustrating a method for a communication apparatus according to an embodiment. In a page message reception step 900, a page message is received from a PLMN, indicating that a party has requested communication. A suitable connection is determined in a connection determination step 902. The determination can, as demonstrated above, be based on different criteria, and the connection can be one or more connections. The determined connection to the Internet, and thus to a page server via the Internet, is established in a connection establishment step 904, and a notification is sent to the page server in a notification sending step 906 such that paging can be closed. From the page server, or another server involved in the transaction, information associated with the IP address of the communication requesting party is gained in an address gaining step 908. Thus, an IP connection can be established with the communication requesting party using the IP address of the communication requesting party in a IP connection provision step 910.

Figure 3:
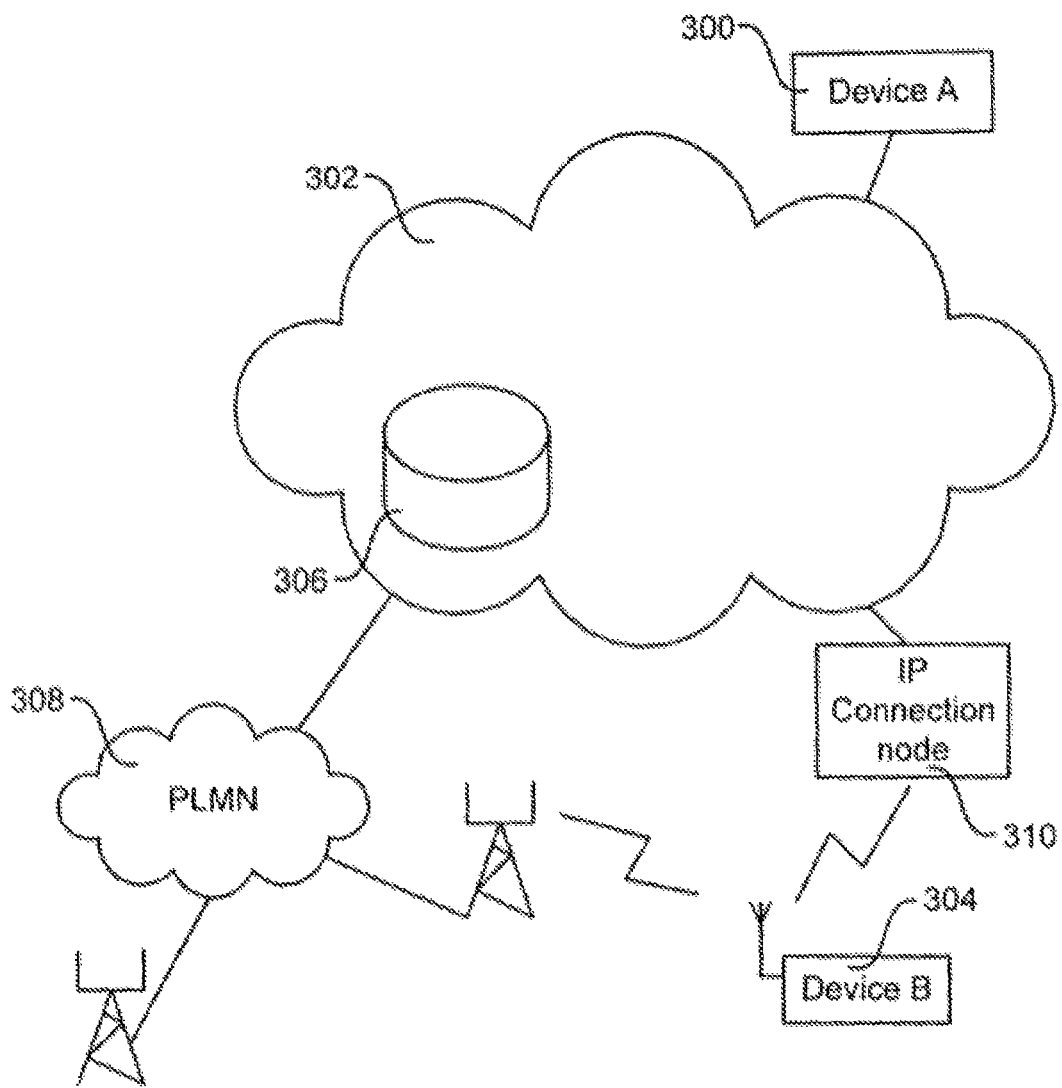
FIG. 3 schematically illustrates an environment for communication between parties according to an embodiment.

FIG. 3 schematically illustrates an environment for communication between parties according to an embodiment. A first device 300 is connected to the Internet 302, through which the first device 300 requests a connection to a second device 304. The request is handled by a page server 306, which sends a page request to a PLMN 308 which is connected to the Internet 302 and thus to the page server 306 being connected to the Internet 302. The PLMN, which can be a GSM network, sends a page message, which can be implemented by provision over a paging channel indicated in a broadcast control channel. The second device 304 receives the page message and establishes a connection to the Internet 302 via an IP connection node 310. Via the Internet 302, the connection is established with the first device 300, and communication is enabled. The second device 304 also sends a notification to the page server 306 via the Internet 302 such that the page server can send a page release instruction to the PLMN 308, whereby the PLMN 308 can close the paging.

Figure 4:
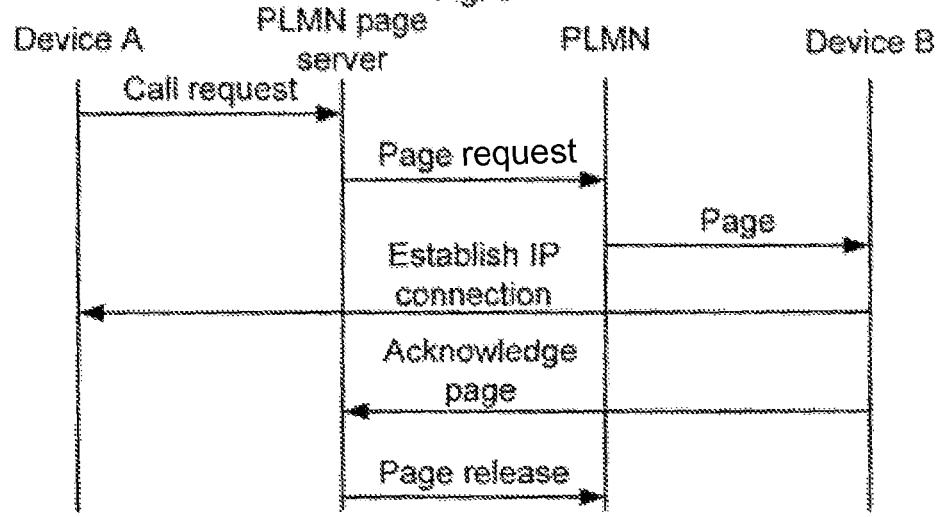
FIG. 4 is a diagram illustrating signal flow between entities involved in communication between parties according to an embodiment.

The transmissions of the above demonstrated signaling are illustrated in FIG. 4, which is a diagram illustrating signal flow between entities involved in communication between parties according to an embodiment. In FIG. 3, the second device 304 is shown as a wireless device communicating via a wireless interface, e.g. WiFi, or WLAN 802.11, to a connection node 310, e.g. a WiFi access point. However, the second device 304 may very well be connected via a wireline to the Internet 302 like the first device 300. This may be attractive in dynamic use cases where the second device is in a roaming situation, for example like guests in a hotel room.

Figure 5:
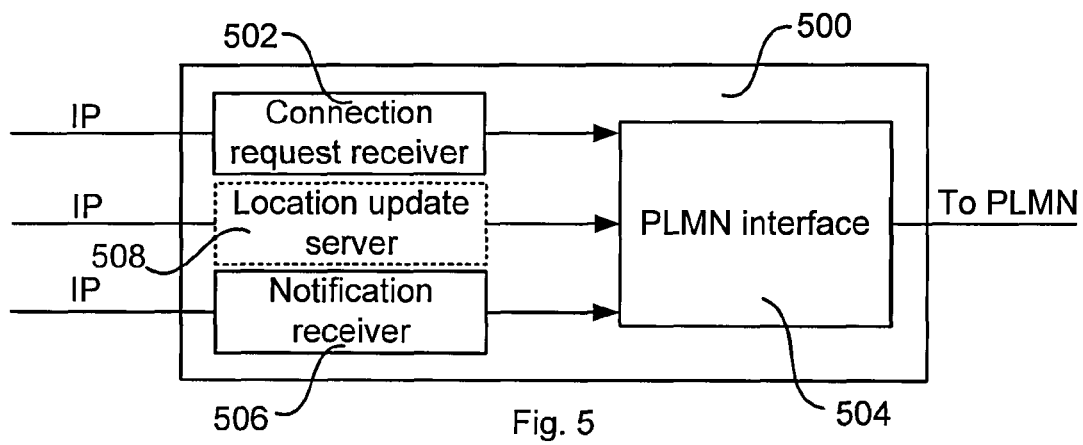
FIG. 5 is a block diagram schematically illustrating a page server according to an embodiment.

FIG. 5 is a block diagram schematically illustrating a page server 500 according to an embodiment. The server 500 comprises a connection request receiver 502 which is connected to the Internet and can receive such a request from a communication apparatus also connected to the Internet. Upon decoding of such a request, information related to the request is provided to a PLMN interface 504, which sends a page request to a PLMN, which also can be connected to the internet, or directly to the PLMN interface. The server 500 also comprises a notification receiver 506, which is enabled to receive a notification on established connection from the now connected party over the Internet. The notification receiver 506 provides information on the received notification, which can be a page acknowledgment, to the PLMN interface 504, which sends a page release instruction to the PLMN such that paging can be closed. Alternatively, the page message does not provide information about the first party. In that case, the second party cannot directly make a connection to the first party. Instead, the information about the first party resides in the page server 500. On a connection request, the second party first connects with the page server 500. The second party thereby acknowledges the page receipt, but also obtains information about the first party, e.g. a name, telephone number, or IP address. Thereafter, the second party connects to the first party. This alternative approach obviates the need for additional information in the paging message on the PLMN air interface.

Figure 6:
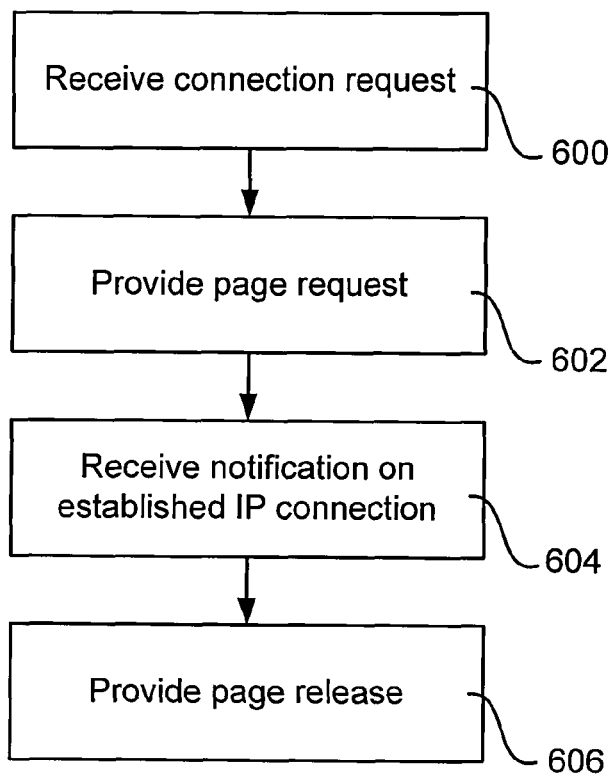
FIG. 6 is a flow chart illustrating a method for a server according to an embodiment.

FIG. 6 is a flow chart illustrating a method for a server according to an embodiment. In a connection request reception step 600, a reception request is received from a first party requesting communication with a second party. A page request is provided, in a page request provision step 602, to a PLMN on provision of a page message to be sent with the intention to reach the second party, which preferably is listening to paging in the PLMN. If establishing of the connection succeeds, the second party sends a notification to the server via the Internet, which notification is received in a notification reception step 604. Upon reception of such a notification, the server provides a page release instruction to the PLMN in a page release provision step 606 such that the PLMN can close paging. Alternative embodiments are illustrated in FIGS. 10 and 11.

Figure 10:
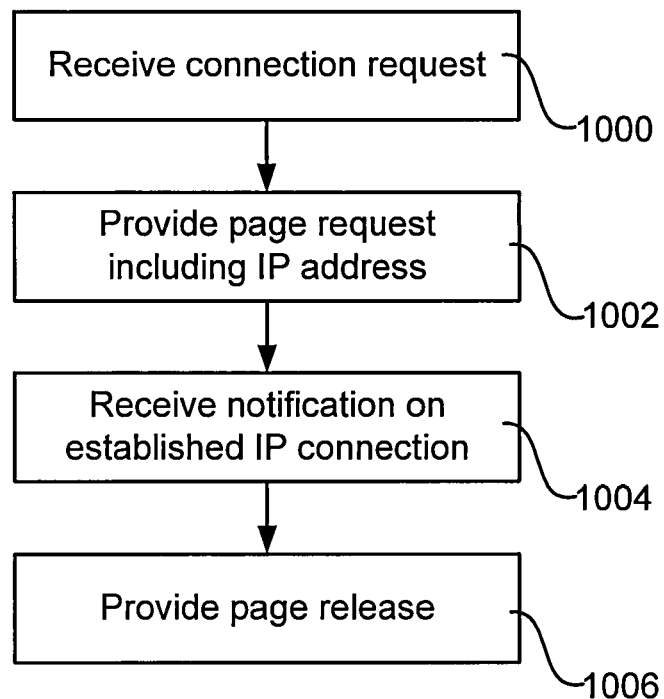
FIG. 10 is a flow chart illustrating a method for a server according to an embodiment.

FIG. 10 is a flow chart illustrating a method for a server according to an embodiment. In a connection request reception step 1000, a reception request is received from a first party requesting communication with a second party. A page request is provided, in a page request provision step 1002, to a PLMN on provision of a page message to be sent with the intention to reach the second party, which preferably is listening to paging in the PLMN. The page message comprises information for the second party to be able to establish connection to the first party via the Internet, e.g. IP address, name or telephone number. If establishing of the connection succeeds, the second party sends a notification to the server via the Internet, which notification is received in a notification reception step 1004. Upon reception of such a notification, the server provides a page release instruction to the PLMN in a page release provision step 1006 such that the PLMN can close paging.

Figure 11:
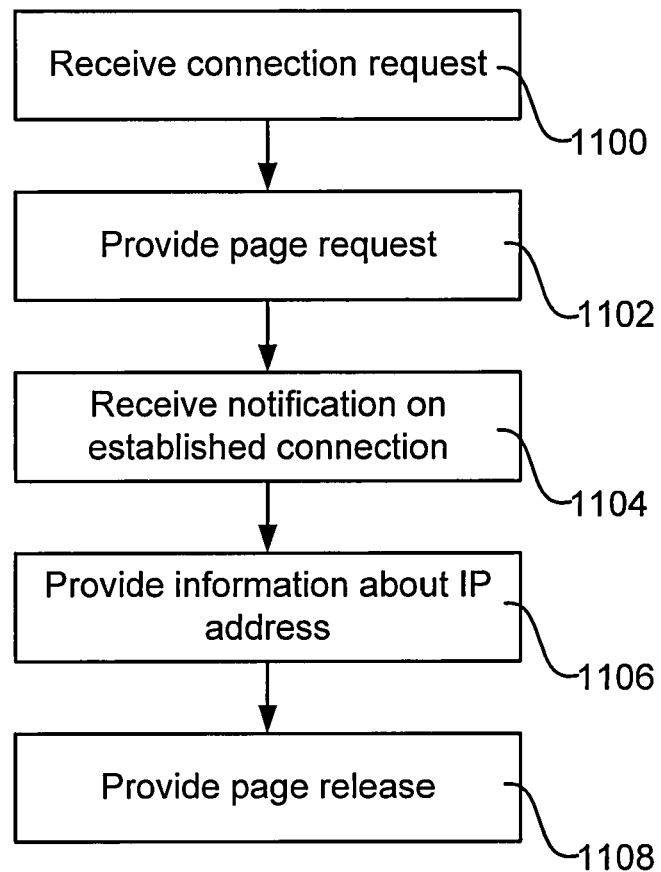
FIG. 11 is a flow chart illustrating a method for a server according to an embodiment.

FIG. 11 is a flow chart illustrating a method for a server according to an embodiment. In a connection request reception step 1100, a reception request is received from a first party requesting communication with a second party. A page request is provided, in a page request provision step 1102, to a PLMN on provision of a page message to be sent with the intention to reach the second party, which preferably is listening to paging in the PLMN. If establishing of the connection succeeds, the second party sends a notification to the server via the Internet, which notification is received in a notification reception step 1104. The page server, or another server involved in the transaction, provides, to the first party accessing the server, information associated with the IP address of the communication requesting party in an address provision step 1106. Thus, an IP connection can be established by the first party with the communication requesting party using the IP address of the communication requesting party. Upon reception of the notification, the server provides a page release instruction to the PLMN in a page release provision step 1108 such that the PLMN can close paging.

The method as described above uses the conventional paging mechanism as applied in cellular systems, e.g. GSM. In order to limit the control signalling overhead caused by paging, the cellular system makes use of location areas (LA). A location area is a group of (adjacent) cells where the paging message is broadcast. LAs are used to avoid the situation that a paging message would need to be broadcast by each cellular base station all over the world. The cellular system knows in which LA a terminal resides by the location updates. Location Area Identities (LAI) or Codes (LAC) are broadcast by the base station in the Broadcast Control Channel (BCCH). The terminal periodically listens to the BCCH; if the LAI changes, it makes contact to the cellular system to update the LA it resides in. By using the location update, the cellular system can now do a limited page when there is an incoming call for the terminal. In the invention as described above, ordinary location updates via the cellular system cannot be made if we assume a GSM receiver-only in communication apparatus 100. Instead, the location updates should be carried by the one or more IP connections as discussed above. The communication apparatus 100 will periodically read the BCCH (which is anyway required to find the Paging Channel PCH). If the read LAI is different from the previous LAI stored in the communication apparatus 100, the communication apparatus 100 connects to the page server 500 to update the LAI information, which can be performed by an optional location update server 508. The update server 508 is provided with the updated LAI information, which it is arranged to provide to the PLMN interface 504 at provision of a page message instruction. On a connection request, page server 500 will send a page request to PLMN 308. The page request can in addition, or alternatively, to the identity (telephone number, IP address, etc.) of the called party include information about the LAI the intended receiver of the page message resides in. The PLMN can then apply a limited page.

Figure 7:
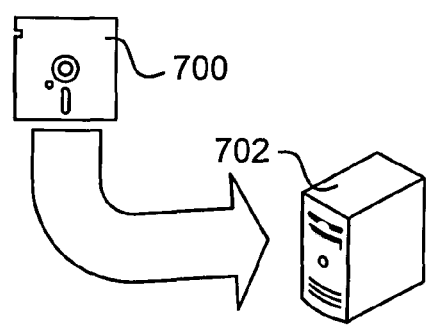
FIG. 7 schematically illustrates a computer readable medium.

The methods according to the present invention are suitable for implementation with aid of processing means, such as computers and/or processors. Therefore, there is provided computer programs, comprising instructions arranged to cause the processing means, processor, or computer to perform the steps of any of the methods according to any of the embodiments described with reference to FIGS. 2, 6, 8, 9, 10 and 11, in the communication apparatus and the page server, respectively. The computer programs preferably comprises program code which is stored on a computer readable medium 700, as illustrated in FIG. 7, which can be loaded and executed by a processing means, processor, or computer 702 to cause it to perform the methods, respectively, according to embodiments of the present invention, preferably as any of the embodiments described with reference to FIGS. 2, 6, 8, 9, 10 and 11, respectively. The computer 702, which can be present in the communication apparatus as illustrated in FIG. 1 or in the server as illustrated in FIG. 5, and computer program product 700 can be arranged to execute the program code sequentially where actions of the any of the methods are performed stepwise, or be performed on a real-time basis, where actions are taken upon need and availability of needed input data. The processing means, processor, or computer 702 is preferably what normally is referred to as an embedded system. Thus, the depicted computer readable medium 700 and computer 702 in FIG. 7 should be construed to be for illustrative purposes only to provide understanding of the principle, and not to be construed as any direct illustration of the elements.

The invention claimed is:

1. A communication apparatus enabled to communicate over at least one communication bearer, the communication apparatus comprising
a receiver arranged to receive an page message from a public land mobile network node, the page message being present when another party requests communication with the communication apparatus, the page message including an IP address of the another party; and
a connection controller arranged to establish a connection to the Internet over at least one of the communication bearers for providing an IP connection to the another party using the IP address of the another party included in the page message, and to send a notification over the established connection to the Internet to a page server managing the paging by the public land mobile network for enabling closing of the paging.

2. The communication apparatus according to claim 1, wherein the public land mobile network is a GSM network.

3. The communication apparatus according to claim 2, wherein the page message is provided over a paging channel indicated in a broadcast control channel of the GSM network.

4. The communication apparatus according to claim 1, wherein the notification to the page server is a page acknowledgement.

5. The communication apparatus according to claim 1, wherein the connection controller is arranged to gain an IP address of the another party from the page server over the established connection to the Internet, and the provision of the IP connection to the another party is performed by using the IP address of the another party.

6. The communication apparatus according to claim 1, wherein the receiver is further arranged to periodically read a control channel, and the apparatus is further arranged to, if location area information on the control channel is different from a previously read location area information stored in the communication apparatus, connect to the page server to update the location area information provided in the page server.

7. A method for establishing an IP connection with another party upon request from the another party, the method comprising
receiving a page message from a public land mobile network node, the page message being present when the another party requests communication, the page message including an IP address of the another party;
determining a connection from at least one feasible connection option to connect to the Internet;
establishing the connection to the Internet over at least one communication bearer for providing an IP connection to the another party using the IP address of the another party included in the page message; and
sending a notification over the established connection to the Internet to a page server managing the paging by the public land mobile network for enabling closing of the paging.

8. The method according to claim 7, wherein the public land mobile network is a GSM network, further comprising determining the paging channel from a broadcast control channel of the GSM network.

9. The method according to claim 7, wherein the determining of the connection comprises a decision based on any of availability, power, cost, or performance needs, or any combination thereof.

10. The method according to claim 7, wherein the determining of the connection comprises determining a plurality of connections to operate in parallel.

11. The method according to claim 7, further comprising gaining an IP address of the another party from the page server over the established connection to the Internet, wherein the providing of the IP connection to the another party is performed by using the IP address of the another party.

12. The method according to claim 7, further comprising periodically reading a control channel; and
if location area information on the control channel is different from a previously read location area information, connecting to the page server to update the location area information provided in the page server.

13. A non-transitory computer-readable medium comprising program code comprising instructions which when executed by a processor are arranged to cause the processor to perform
receiving of a page message from a public land mobile network node, the page message being present when the another party requests communication, the page message including an IP address of the another party; and
establishing of a connection to the Internet over at least one communication bearer for providing an IP connection to the another party using the IP address of the another party included in the page message; and
sending of a notification over the established connection to the Internet to a page server managing the paging by the public land mobile network for enabling closing of the paging.

14. The non-transitory computer-readable medium according to claim 13, wherein the instructions are further arranged to cause the processor to gain an IP address of the another party from the page server over the established connection to the Internet, and to provide the IP connection to the another party by using the IP address of the another party.

15. The non-transitory computer-readable medium according to claim 13, wherein the instructions are further arranged to cause the processor to
enable periodical reading of a control channel; and
if location area information on the control channel is different from a previously read location area information, provide a connection to the page server to update the location area information provided in the page server.

16. A page server connected to the Internet comprising
a connection request receiver arranged to receive a request from a first party requesting communication with a second party;

an interface for communicating with a public land mobile network, wherein the interface is arranged to provide a page request including an IP address of the first party to the public land mobile network, upon the received request from the first party, on provision of an page message; and a notification receiver arranged to receive a notification, over an established connection between the second party and the Internet, that the page message is received, wherein the interface is further arranged to provide a page release request, upon the reception of the notification, to the public land mobile network for closing of the paging.

17. The page server according to claim 16, further comprising a table comprising a set of IP addresses and their associated Local Area Codes, such that the page request further comprises the Local Area Code associated with its IP address.

18. The page server according to claim 17, further being arranged to be accessed by a party for updating of location area information of the party.

19. The page server according to claim 16, further being arranged to provide information associated with the IP address of the first party to the second party over its connection to the Internet.

20. The page server according to claim 19, further comprising a table comprising a set of IP addresses and their associated Local Area Codes, such that the provided information to the second party further comprises the Local Area Code associated with its IP address.

21. A method for providing connection between a first party and a second party, the method comprising
receiving a request over the Internet from a first party requesting communication with a second party;
providing a page request including an IP address of the first party to a public land mobile network, upon the receiving of the request from the first party, on provision of a page message such that the page message is transmitted on a paging channel such that the second party can establish a connection to the Internet over at least one communication bearer for providing an IP connection to the first party;
receiving a notification, over an established connection between the second party and the Internet, that the page message is received; and
providing a page release request, upon the reception of the notification, to the public land mobile network for closing of the paging.

22. The method according to claim 21, wherein the providing of the IP connection to the another party is performed by using the IP address of the another party.

23. The method according to claim 22, further comprising determining a Local Area Code associated with the IP address of the second party; and
including the Local Area Code in the page request.

24. The method according to claim 23, further comprising enabling access by a party for receiving update information about location area information of the party.

25. The method according to claim 21, further comprising providing information associated with an IP address of the another party from the page server over the established connection to the Internet such that the providing of the IP connection to the another party is performed by using the IP address of the another party.

26. The method according to claim 25, further comprising determining a Local Area Code associated with the IP address of the second party; and
including the Local Area Code in the providing of information.

27. A non-transitory computer-readable medium comprising program code comprising instructions which when executed by a processor is arranged to cause the processor to perform
receiving of a request over the Internet from a first party requesting communication with a second party;
providing of a page request including an IP address of the first party to a public land mobile network, upon the receiving of the request from the first party, on provision of a page message such that the page message is transmitted on a paging channel such that the second party can establish a connection to the Internet over at least one communication bearer for providing an IP connection to the first party;
receiving of a notification, over an established connection between the second party and the Internet, that the page message is received; and
providing of a page release request, upon the reception of the notification, to the public land mobile network for closing of the paging.

28. The non-transitory computer-readable medium according to claim 27, wherein the instructions are further arranged such that the providing of the IP connection to the another party is performed by using the IP address of the another party.

29. The non-transitory computer-readable medium according to claim 28, wherein the program code further comprises instructions which when executed by a processor is arranged to cause the processor to perform
determining a Local Area Code associated with the IP address of the second party; and
including the Local Area Code in the page request.

30. The non-transitory computer-readable medium according to claim 29, wherein the program code further comprises instructions which when executed by a processor are arranged to cause the processor to enable access by a party for receiving update information about location area information of the party.

31. The non-transitory computer-readable medium according to claim 27, wherein the instructions are further arranged to cause the processor to provide information associated with an IP address of the another party from the page server over the established connection to the Internet such that the providing of the IP connection to the another party is performed by using the IP address of the another party.

32. The non-transitory computer-readable medium according to claim 31, wherein the program code further comprises instructions which when executed by a processor is arranged to cause the processor to perform
determining a Local Area Code associated with the IP address of the second party; and
including the Local Area Code in the provided information.

* * * * *